(12) United States Patent
Aoyama et al.

(10) Patent No.: US 8,014,045 B2
(45) Date of Patent: Sep. 6, 2011

(54) IMAGE SCANNER WITH IMAGE SCANNING DEVICE POSITIONING

(75) Inventors: Takeshi Aoyama, Abiko (JP); Ayumu Murakami, Abiko (JP); Shoko Magata, Toride (JP); Yuichi Yamamoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1132 days.

(21) Appl. No.: 11/215,274

(22) Filed: Aug. 30, 2005

(65) Prior Publication Data

US 2006/0044632 A1    Mar. 2, 2006

(30) Foreign Application Priority Data

Sep. 2, 2004    (JP) ................................ 2004-256058

(51) Int. Cl.
*H04N 1/04* (2006.01)

(52) U.S. Cl. ...................................... 358/496; 358/497
(58) Field of Classification Search .................. 358/496
See application file for complete search history.

(56) References Cited

U.S. PATENT DOCUMENTS

| 4,908,672 | A | * | 3/1990 | Ito ................................. 399/82 |
| 6,027,109 | A |   | 2/2000 | Wada |
| 6,163,388 | A | * | 12/2000 | Lee et al. ...................... 358/488 |
| 2002/0054380 | A1 | * | 5/2002 | Takeuchi et al. ............. 358/498 |
| 2002/0131092 | A1 | * | 9/2002 | Tanaka et al. ................. 358/474 |
| 2003/0116934 | A1 | * | 6/2003 | Endo et al. ................. 280/47.35 |
| 2004/0256792 | A1 | * | 12/2004 | Kuwata et al. ................ 271/207 |

FOREIGN PATENT DOCUMENTS

| JP | 10-142851 | 5/1998 |
| JP | 10-224553 | 8/1998 |

* cited by examiner

*Primary Examiner* — Benny Tieu
*Assistant Examiner* — Qian Yang
(74) *Attorney, Agent, or Firm* — Canon U.S.A., Inc., IP Division

(57) ABSTRACT

An image scanner in which in scanning an image of a document placed on a scanner body, an image scanning device moves and scans the image of the document. In scanning an image of a document fed by a document feeder to the scanner body, the image scanning device moves to a predetermined scanning position and then scans the image of the document in the scanning position. When the image scanning device arrives at the scanning position, the image scanning device is pressed against a stopper that is positioned relative to the document feeder.

7 Claims, 8 Drawing Sheets

IMAGE SCANNER WITH IMAGE SCANNING DEVICE POSITIONING

BACKGROUND OF THE INVENTION

1. Field of the Invention

The present invention relates to an image scanner, and more specifically, it relates to a structure for properly positioning an image scanning device.

2. Description of the Related Art

Image scanners that have a scanner body and a document feeder for feeding documents to the scanner body are known. In some of them, the document feeder can open and close like a lid of the scanner body.

When an image of a document placed on a document bed glass is scanned, an image scanning device provided in the scanner body moves in the sub-scanning direction and scans the image of the document. To scan an image of a document placed on a document bed glass will hereinafter be referred to as "flatbed scanning." When an image of a document being moved on the document bed glass by the document feeder is scanned, the image scanning device moves to a predetermined scanning position and then scans the image of the document in the scanning position. To scan an image of a document being moved on the document bed glass by the document feeder will hereinafter be referred to as "sheet-feed scanning."

When the document feeder is attached to the scanner body, the position of the document feeder is adjusted in order to ensure a predetermined relation between the scanning position, the position of the document feeder, and the direction in which a document is moved.

Japanese Patent Laid-Open No. 10-224553 discusses an image scanner in which an image scanning device of a scanner body is pressed against a document-conveying roller of a document feeder in order to ensure the position of the image scanning device relative to a document.

Japanese Patent Laid-Open No. 10-142851 (corresponding to U.S. Pat. No. 6,027,109) discusses an image scanner including a document feeder that has a sheet feeding device, a sheet conveying device, and a sheet discharging device formed as a unit, the unit having a projection to be pressed against the upper surface of a platen glass of a scanner body. The unit is positioned relative to the scanner body in the vertical direction. Therefore, when the document feeder is attached to the scanner body, adjustment in the vertical direction is made easy.

However, in the image scanner of Japanese Patent Laid-Open No. 10-224553, when adjustment of the document feeder is performed, a document is actually moved by the document feeder and it is calculated from the scanned image how much adjustment is required. Therefore, the adjustment takes a lot of time. In addition, when a document is actually moved and scanned, the scanned image varies depending on the condition of the document and the condition of the conveyance, and therefore it is difficult to achieve accurate adjustment.

Moreover, it is difficult to accurately position the image scanning device relative to the document feeder even if the image scanning device is pressed against the document-conveying roller. Therefore, it is difficult to ensure the relation between the scanning position, the position of the document feeder, and the direction in which a document is moved.

In the image scanner of Japanese Patent Laid-Open No. 10-142851, when the document feeder is attached to the scanner body, adjustment in the vertical direction is not needed. However, a document moved by the document feeder can skew relative to the scanner body. Therefore, the document feeder needs to be adjusted relative to the scanner body so that the document does not skew.

SUMMARY OF THE INVENTION

The present invention is directed to an image scanner in which an image scanning device can be accurately positioned relative to a document feeder, and the document feeder can be easily attached to a scanner body.

In an aspect of the present invention, an image scanner includes a scanner body configured to scan an image of a document, the scanner body including an image scanning device; a document feeder configured to feed documents to the scanner body, the document feeder being attached to the scanner body in a manner such that the document feeder can open and close; and a stopper positionable relative to the document feeder so as to position the image scanning device. When an image of a document placed on the scanner body is scanned, the image scanning device moves and scans the image of the document. When an image of a document fed by the document feeder to the scanner body is scanned, the image scanning device moves to a predetermined scanning position and then scans the image of the document in the scanning position. When the image scanning device arrives at the scanning position, the image scanning device is pressed against the stopper. The stopper is positioned relative to the document feeder.

In another aspect of the present invention, an image scanner includes a scanner body configured to scan an image of a document, the scanner body including an image scanning device and a stopper, the stopper having a hole; and a document feeder configured to feed documents to the scanner body, the document feeder being attached to the scanner body in a manner such that the document feeder can open and close, the document feeder having a pin adapted to be fitted in the hole of the stopper. When an image of a document placed on the scanner body is scanned, the image scanning device moves and scans the image of the document. When an image of a document fed by the document feeder to the scanner body is scanned, the image scanning device moves to a predetermined scanning position and then scans the image of the document in the scanning position. When the image scanning device arrives at the scanning position, the image scanning device is pressed against the stopper.

Further features of the present invention will become apparent from the following description of exemplary embodiments (with reference to the attached drawings).

DESCRIPTION OF THE EMBODIMENTS

Embodiments of the present invention will now be described in detail with reference to the drawings.

Figure 1:
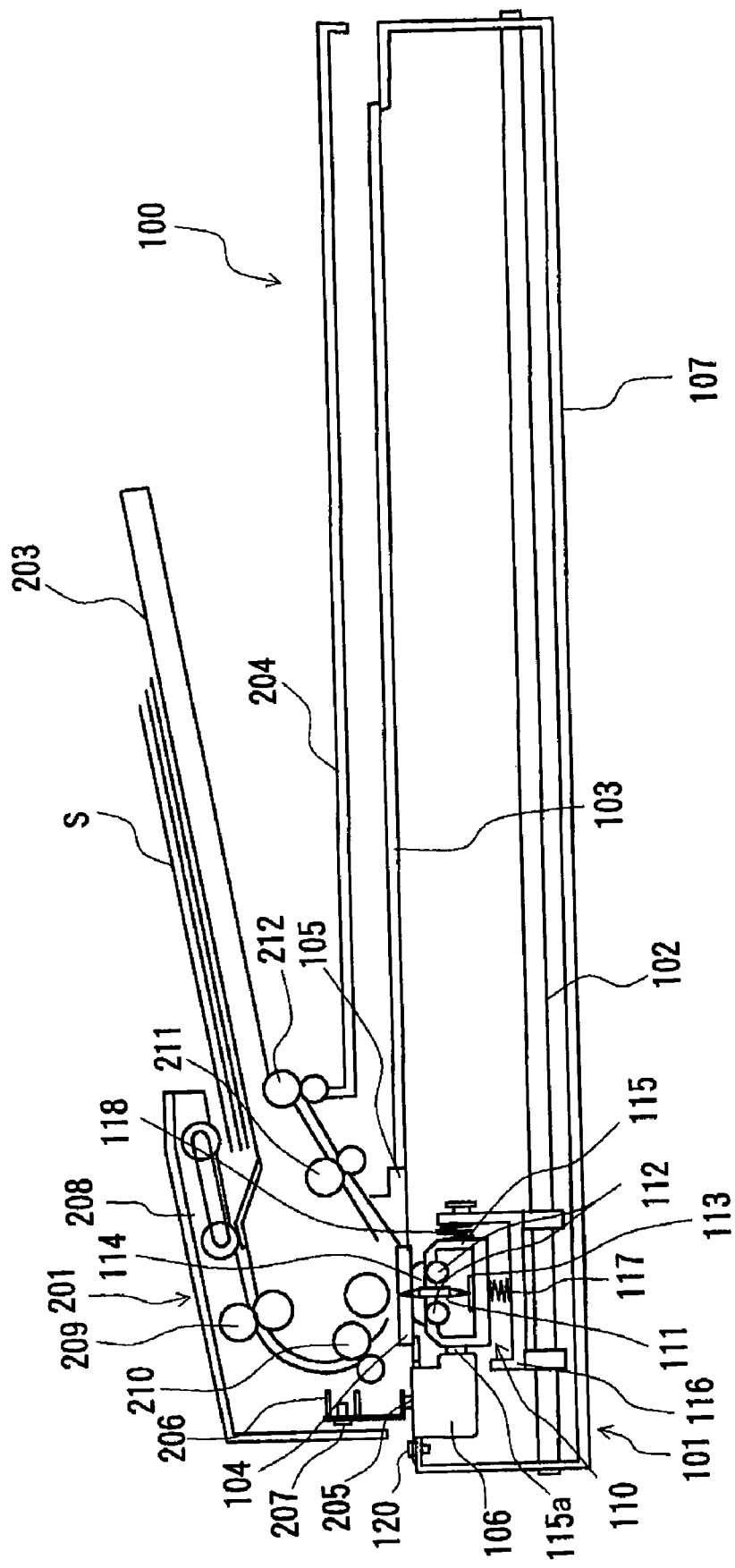
FIG. 1 shows the structure of an image scanner according to a first embodiment of the present invention.

FIG. 1 shows the structure of an image scanner according to a first embodiment of the present invention.

In FIG. 1, reference numeral 100 denotes the image scanner. The image scanner 100 includes a scanner body 101 and a document feeder 201 feeding documents S to the scanner body 101.

The scanner body 101 has a contact image sensor (hereinafter referred to as CIS) 110, which corresponds to an image scanning device. The CIS 110 includes a gradient-index lens 111 as an imaging device, xenon lamps 112 as illuminating devices, and an image sensor board 113 as a sensor unit. The gradient-index lens 111, the xenon lamps 112, and the image sensor board 113 are contained in a case 115. The image sensor board 113 has a plurality of photoelectric elements, which are arrayed in the direction perpendicular to the plane of the paper in FIG. 1 (in the main scanning direction). The image data from the photoelectric elements are transmitted in the order in which they are arrayed.

The CIS 110 is contained in a box-shaped carriage 116 and can move vertically therein. The CIS 110 is pressed upward by a spring 117. In flatbed scanning, the CIS 110 with a slider 114 thereon is located under a document bed glass 103 on which a document S is placed. In sheet-feed scanning, the CIS 110 with the slider 114 thereon is located under another document bed glass (a sheet-feed scanning glass) 104 over which a document S passes. The slider 114 is a known slider, for example, a slider having rollers.

Figure 2:
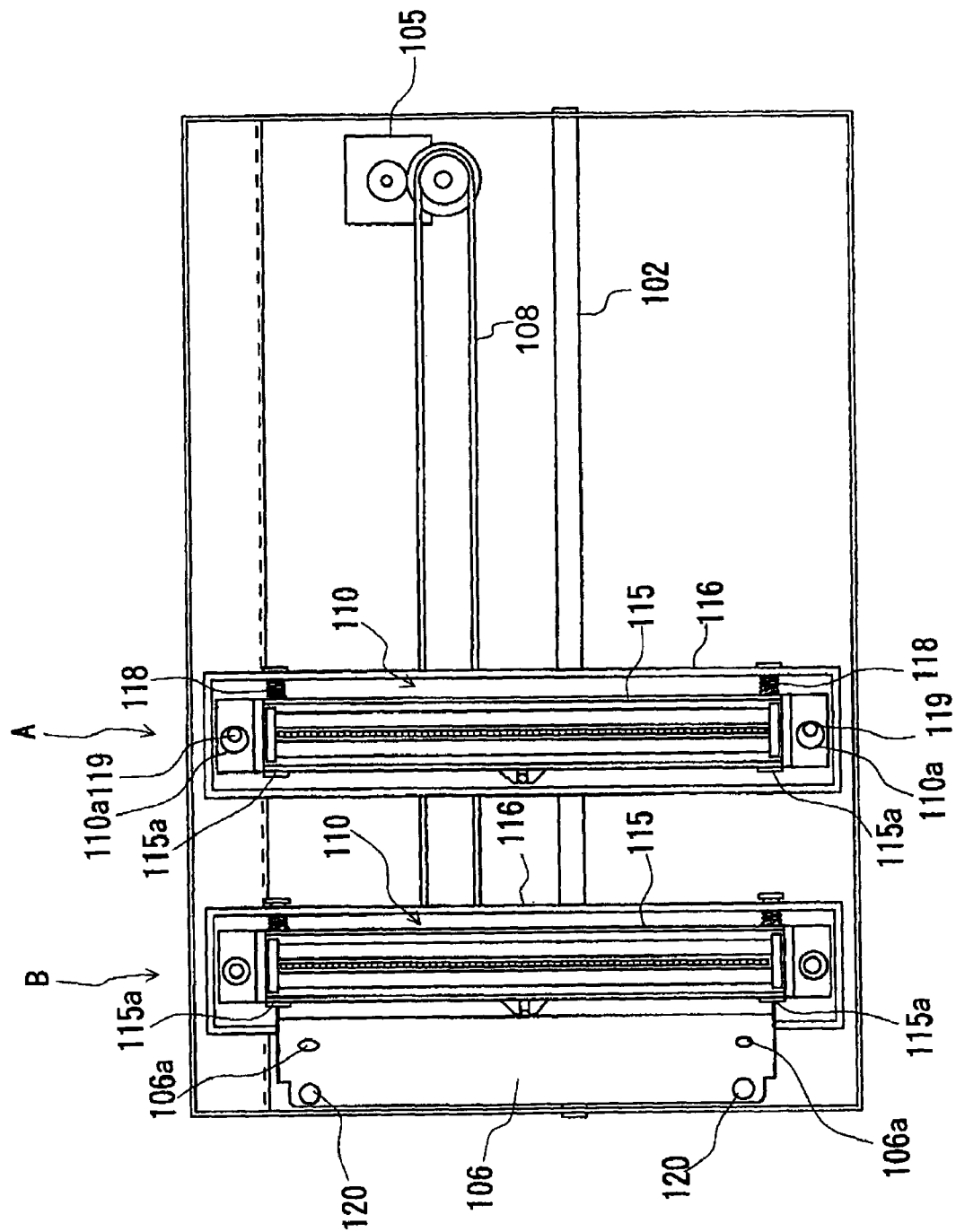
FIG. 2 is a top plan view of the image scanner.

As shown in FIG. 2, guided by a guide shaft 102 and driven by a timing belt 108 that is driven by a motor 105, the CIS 110 can move in the direction perpendicular to the main scanning direction (the sub-scanning direction). In flatbed scanning, the CIS 110 moves in the sub-scanning direction and scans the image of the document.

In FIG. 2, reference numeral 110a denotes holes formed at both ends of the CIS 110 in the main scanning direction. Reference numeral 119 denotes pins projecting from the box-shaped carriage 116. Reference numeral 118 denotes springs disposed between the carriage 116 and the CIS 110. The pins 119 of the carriage 116 are loosely fitted in the holes 110a of the CIS 110. The CIS 110 is pressed leftward in FIG. 2 by the springs 118. At a starting position shown by reference character A where the flatbed scanning is started, the springs 118 press the CIS 110 so that the inner walls of the holes 110a of the CIS 110 come into contact with the pins 119. The contact between the pins 119 and the inner walls of the holes 110a positions the CIS 110 at the starting position.

The document feeder 201 will be described with reference to FIG. 1. The document feeder 201 has a paper tray 203 on which documents S are placed. The document feeder 201 has a feeding unit 208, a register roller 209, an upstream scanning roller 210, and a downstream scanning roller 211. The feeding unit 208 feeds the documents S placed on the paper tray 203 one at a time. The register roller 209 corrects any skew of the documents S. The upstream scanning roller 210 and the downstream scanning roller 211 make the documents S pass over the sheet-feed scanning glass 104. The document feeder 201 has a paper discharging roller 212, which discharges the scanned documents S onto a discharged-paper tray 204.

Reference numeral 107 denotes a scanner frame. The guide shaft 102, the document bed glass 103, the sheet-feed scanning glass 104, and a jump platform 105 are fixed to the scanner frame 107.

Next, concerning the image scanner 100 configured as above, how it scans an image of a document will be described.

First, the flatbed scanning (in which an image of a document S placed on the document bed glass 103 is scanned) will be described. After a document S is placed on the document bed glass 103, the CIS 110 is moved in the sub-scanning direction together with the carriage 116 along the guide shaft 102 by the motor 105 via the timing belt 108. While the CIS 110 is moved, the xenon lamps 112 illuminate the document on the document bed glass 103, and light reflected by the document passes through the gradient-index lens 111 to form an image with 1× magnification on the image sensor board 113. In this way, the image data of the document is scanned.

Next, the sheet-feed scanning (in which an image of a document S moved by the document feeder 201 is scanned) will be described. The scanner body 101 moves the CIS 110 to a predetermined scanning position, i.e., a sheet-feed scanning position B under the sheet-feed scanning glass 104. Next, the feeding unit 208 of the document feeder 201 feeds the documents S placed on the paper tray 203 one at a time. Any skew of the document S fed by the feeding unit 208 is corrected by the register roller 209. Next, the document S is passed over the sheet-feed scanning glass 104 by the upstream scanning roller 210.

At this time, the CIS 110 is located under the sheet-feed scanning glass 104. While the document S is passed over the sheet-feed scanning glass 104, the xenon lamps 112 of the CIS 110 illuminate the document S. Light reflected by the document passes through the gradient-index lens 111 to form an image on the image sensor board 113. In this way, the image data of the document is scanned.

The scanned document S is guided by the jump platform 105 back to the document feeder 201 and is discharged by the downstream scanning roller 211 and the paper discharging roller 212 onto the discharged-paper tray 204.

Figure 3:
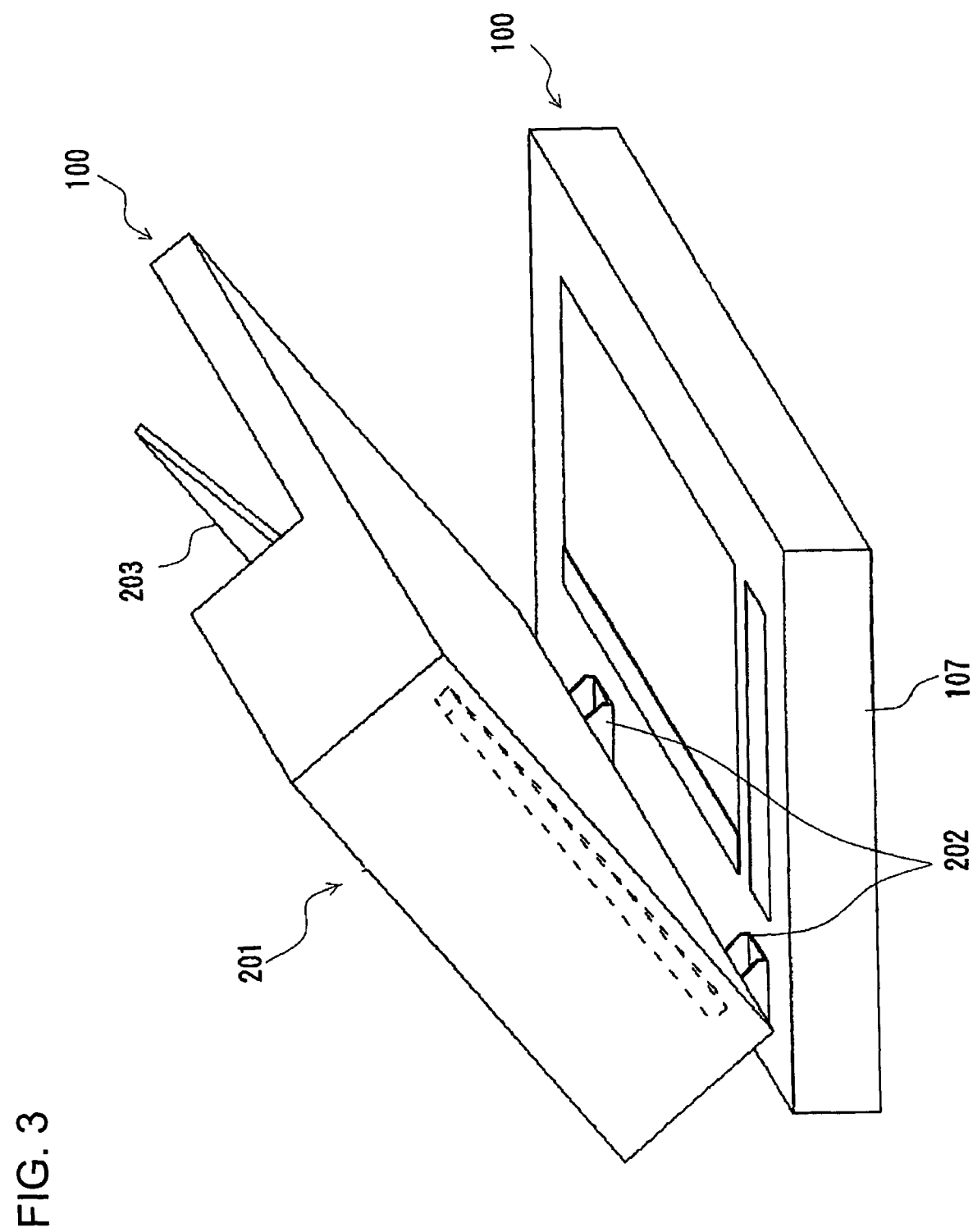
FIG. 3 is a perspective view of the image scanner.

As shown in FIG. 3, the document feeder 201 is attached to the scanner body 101 with hinges 202 so that it can open and close (contact and separate from the scanner body 101). In the flatbed scanning, after a document S is placed on the document bed glass 103, the document feeder 201 is closed to press the document S against the document bed glass 103.

In FIGS. 1 and 2, reference numeral 106 denotes a stopper. When the CIS 110 arrives at the sheet-feed scanning position shown by reference character B in FIG. 2 in order to perform the sheet-feed scanning, projections 115a of the case 115 of the CIS 110 are pressed against the stopper 106. Pressing the CIS 110 against the stopper 106 properly positions the CIS 110. That is to say, the CIS 110 is positioned so that the direction in which photoelectric elements (not shown) are arrayed is perpendicular to the direction in which documents are moved by the rollers 210 and 211 of the document feeder 201. Therefore, the image can be scanned accurately.

The CIS 110 pressed against the stopper 106 moves relative to the carriage 116 in the opposite direction to the motion of the carriage 116, against the springs 118. Therefore, the pins 119 come out of contact with the inner walls of the holes 110a. That is to say, when the CIS 110 is pressed against the stopper 106, the carriage 116 is not involved in the positioning of the CIS 110.

Figure 4A:
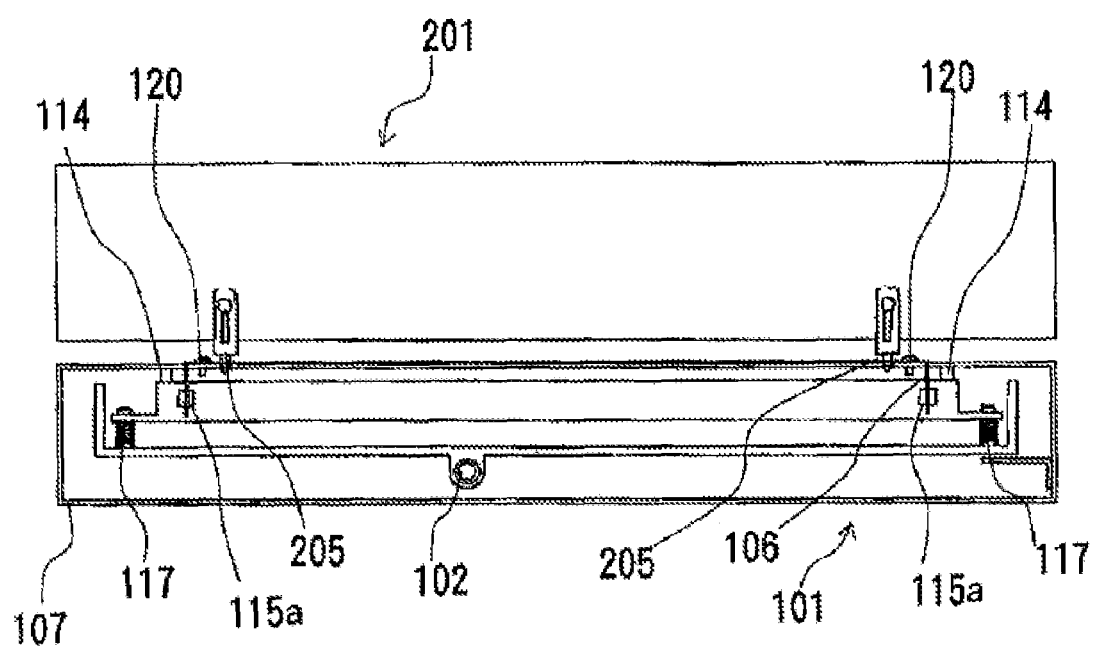
FIGS. 4A and 4B illustrate how a stopper is positioned relative to a document feeder in the image scanner.
Figure 4B:
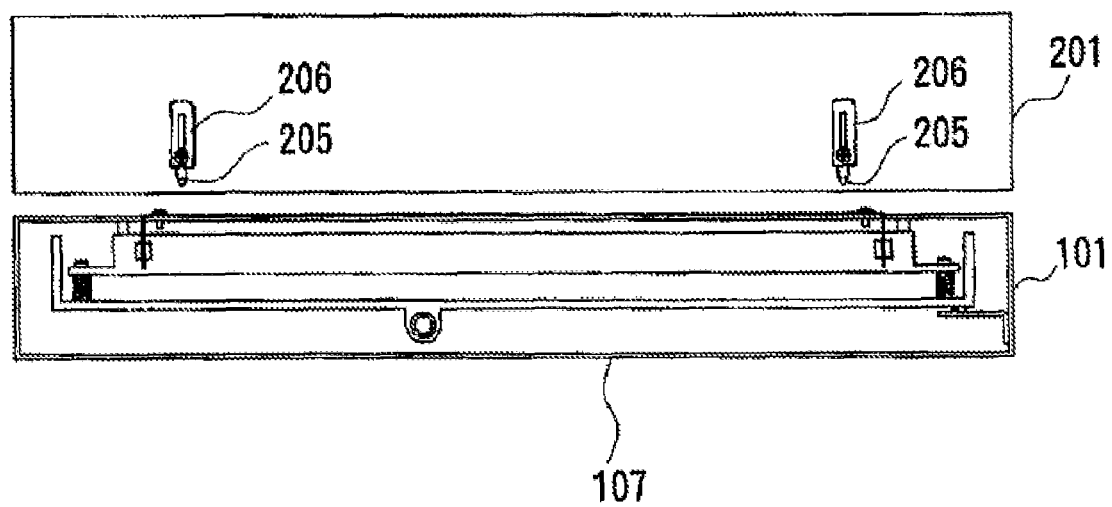

The stopper 106 has holes 106a in the top at both ends in the main canning direction (see FIG. 2). As shown in FIGS. 4A and 4B, the document feeder 201 has positioning pins 205 to be fitted into the holes 106a.

How to attach the document feeder 201 and the stopper 106 to (the scanner frame 107 of) the scanner body 101 will now be described.

First, the stopper 106 is loosely attached to the scanner body 101. Next, the document feeder 201 is attached to the scanner body 101 with hinges 202 in a manner such that it can be opened and closed.

Next, the document feeder 201 is rotated downward to be closed. As shown in FIG. 4A, closing the document feeder 201 fits the positioning pins 205 of the document feeder 201 into the holes 106a of the stopper 106. The stopper 106 is properly positioned by the document feeder 201, that is to say, by fitting the positioning pins 205 into the holes 106a.

Next, with the positioning pins 205 fitted in the holes 106a of the stopper 106, the stopper 106 is fixed to the scanner frame 107 with screws 120 (see FIG. 2).

As described above, the document feeder 201 properly positions the stopper 106, and the stopper 106 properly positions the CIS 110. Therefore, the CIS 110 can be properly positioned through the intermediation of the stopper 106, and the CIS 110 is accurately positioned relative to the document feeder 201.

In the present embodiment, first, the document feeder 201 is attached to the scanner body 101, and then, the stopper 106 is properly positioned using the document feeder 201. Therefore, the document feeder 201 need not be adjusted relative to the scanner body 101. Incidentally, if the stopper 106 is displaced due to deformation with age, the position of the stopper 106 can be easily corrected in the above-described manner. Since the document feeder 201 need not be adjusted relative to the scanner body 101, less man-hours are required during manufacture.

The operation after the stopper 106 is fixed with the screws 120 will be described. The positioning pins 205 are held by stays 206. The stays 206 are moved upward and then fixed so that the positioning pins 205 are separated from the scanner body 101 when the document feeder 201 is closed (see FIG. 4B). That is to say, after the stopper 106 is fixed with the screws 120, the positioning pins 205 are fixed in positions where the pins do not project from the document feeder 201 toward the scanner body 101. Therefore, in normal operation, the document S is prevented from being caught between the positioning pins 205 and the scanner body 101 and damaged.

Alternatively, the positioning pins 205 may be detachable from the document feeder 201. In this case, after the fixation of the stopper 106 is completed, the positioning pins 205 are detached from the document feeder 201.

The positioning pins 205 of the document feeder 201 and the holes 106a of the stopper 106 constitute a positioning device for properly positioning the CIS 110. This positioning device properly positions the CIS 110 relative to the document feeder 201 in the direction in which the document is moved. Therefore, the document feeder 201 need not be adjusted relative to the scanner body 101. In addition, highly accurate positioning can be achieved. Therefore, the difference in position and angle between a document S and a scanned image can be minimized at low cost and with high reliability.

Figure 8:
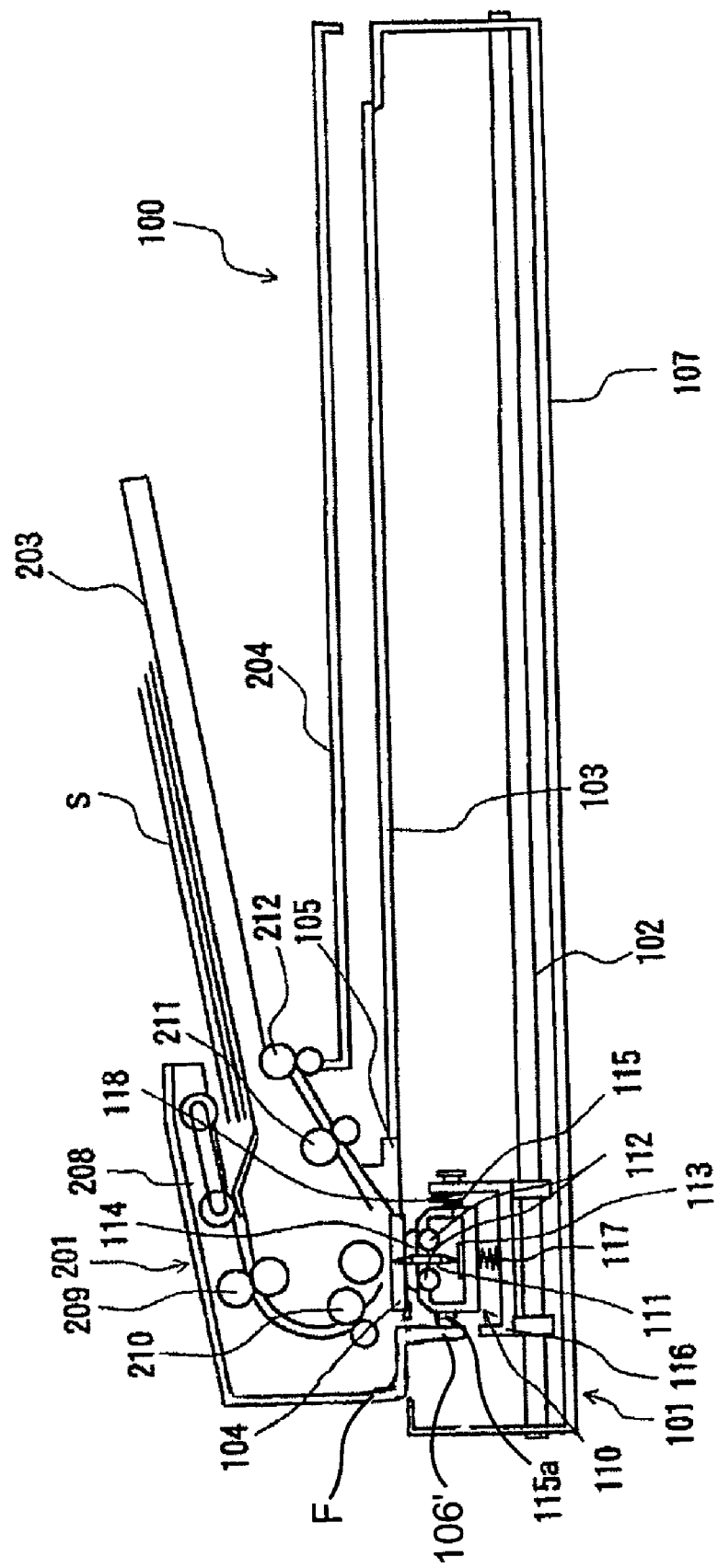
FIG. 8 shows a modification of the present invention.

In the above embodiment, the stopper 106 is properly positioned using the positioning pins 205. Alternatively, as in the modification shown in FIG. 8, the document feeder 201 may have a stopper against which the case 115 of the CIS 110 is pressed. In FIG. 8, the projections 115a of the case 115 of the CIS 110 are pressed against a stopper 106'. Pressing the CIS 110 against the stopper 106' properly positions the CIS 110. The stopper 106' is integral with the frame F of the document feeder 201. The stopper 106' is a rib projecting from the document feeder 201 toward the scanner body 101. It goes without saying that the stopper 106' is perpendicular to the direction in which a document is moved by the conveyance system (including the rollers 210 and 211) of the document feeder 201.

Next, a second embodiment of the present invention will be described.

Figure 5:
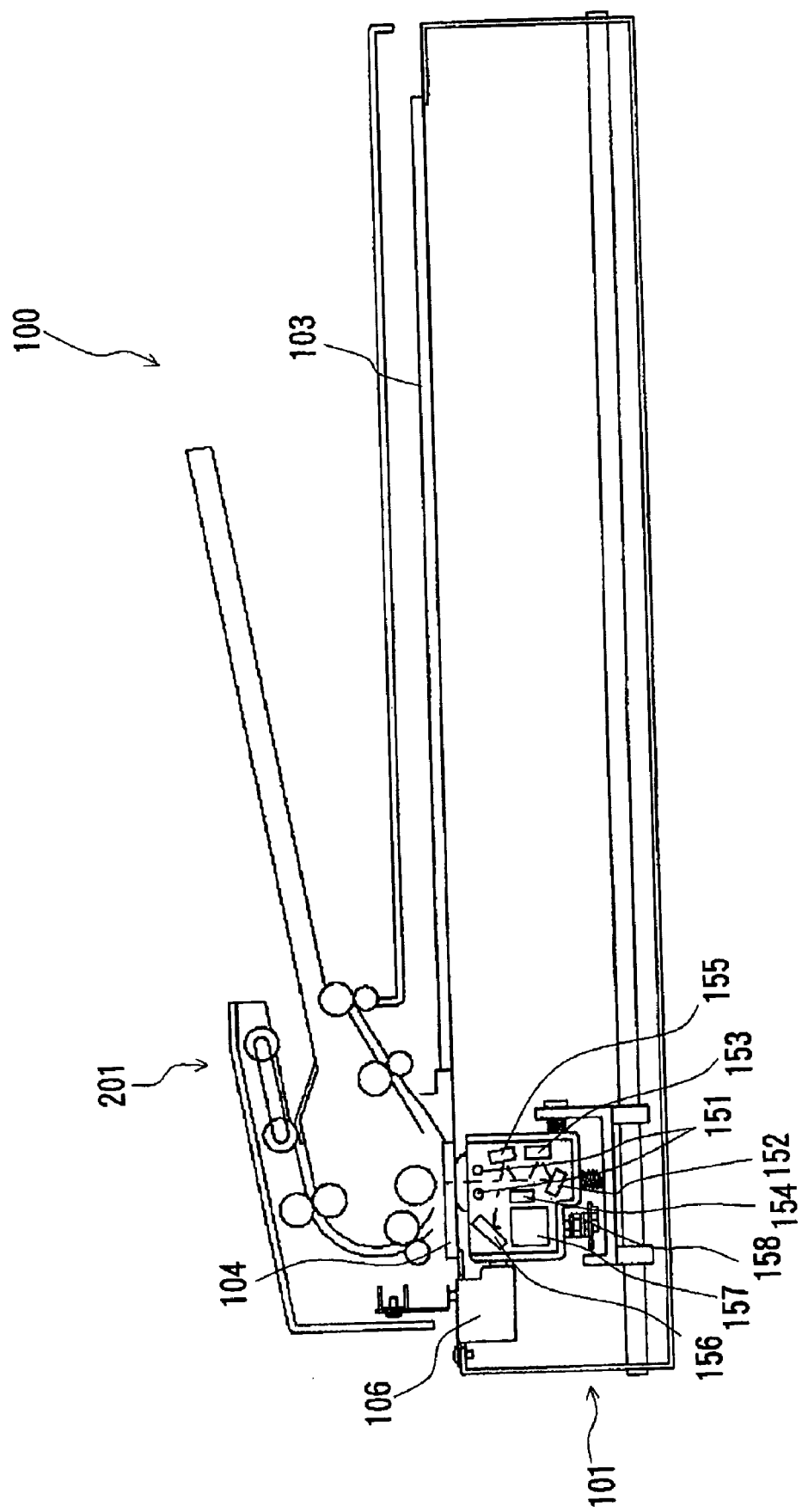
FIG. 5 shows the structure of an image scanner according to a second embodiment of the present invention.

FIG. 5 shows the structure of an image scanner according to the present embodiment. Incidentally, in FIG. 5, the same reference numerals will be used to designate the same or corresponding components as those in FIG. 1.

In FIG. 5, reference numeral 151 denotes xenon lamps as illuminating devices. Reference numerals 152 to 156 denote reflecting mirrors. Reference numeral 157 denotes an imaging lens as an imaging device. Reference numeral 158 denotes a CCD (charge coupled device) receiving the light reflected by the document S. The present embodiment has a so-called "one-box-type" image scanning device in which the xenon lamps 151, the reflecting mirrors 152 to 156, the imaging lens 157, and the CCD 158 are contained in a case 150.

The one-box-type image scanning device 106 is positioned relative to the document bed glass 103, the sheet-feed scanning glass 104, and the stopper 106 in the same manner as in the first embodiment. The stopper 106 is also fixed in the same manner as in the first embodiment. The one-box-type image scanning device is properly positioned by being pressed against the stopper 106. The one-box-type image scanning device 106 scans a document placed on the document bed glass 103 and a document being moved on the sheet-feed scanning glass 104 by the document feeder 201.

The one-box-type image scanning device can be used in the modification shown in FIG. 8.

In the above-described image scanners, the position of the image scanning device in flatbed scanning is different from that in sheet-feed scanning. However, the present invention is not limited to this and can also be applied to an image scanner in which both a stationary document and a moving document are scanned through a common document bed glass 131. Such an image scanner will be described as a third embodiment of the present invention.

Figure 6:
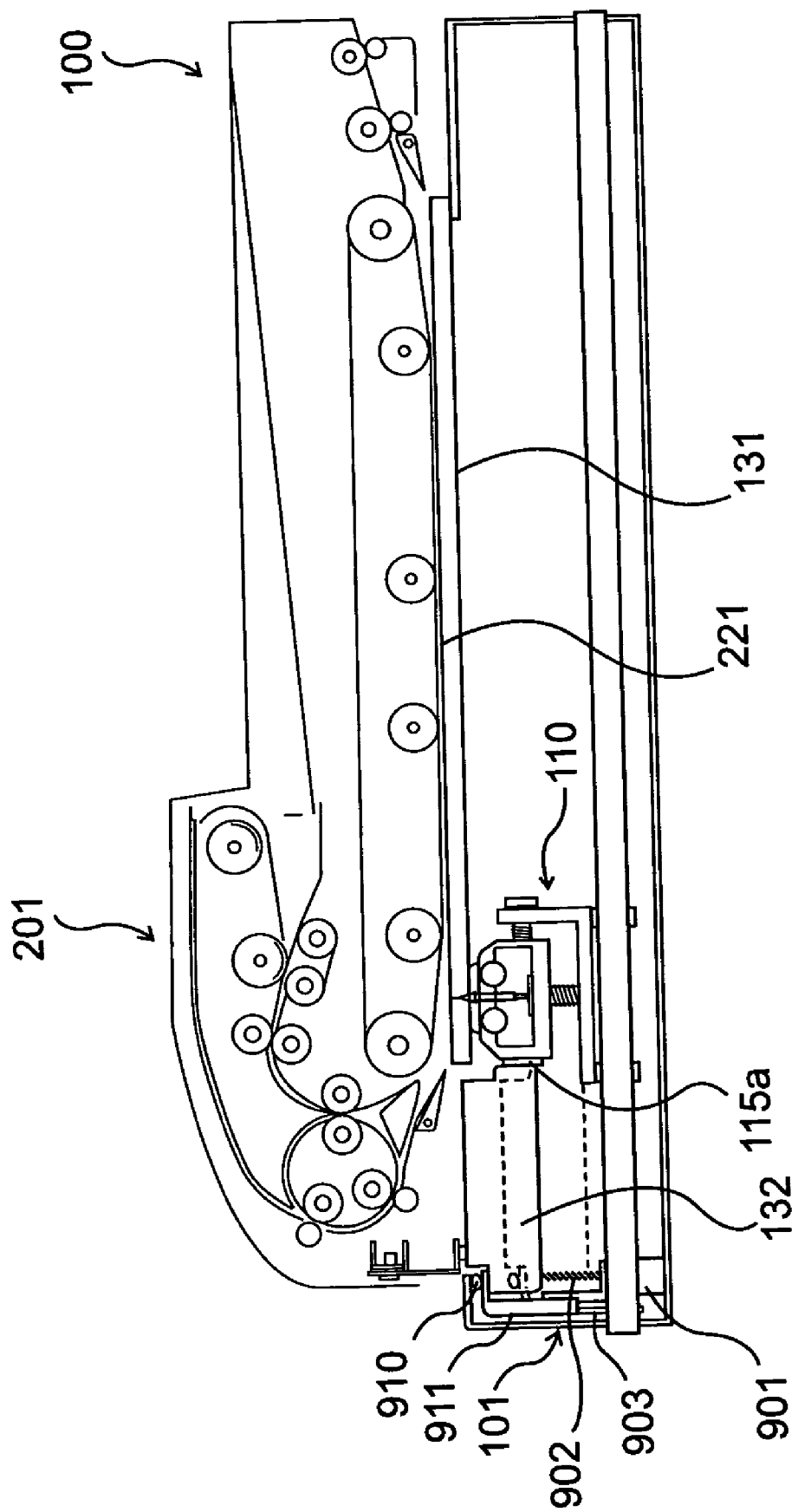
FIG. 6 shows the structure of an image scanner according to a third embodiment of the present invention.

FIG. 6 shows the structure of an image scanner according to the present embodiment. Incidentally, in FIG. 6, the same reference numerals will be used to designate the same or corresponding components as those in FIG. 1.

In FIG. 6, reference numeral 132 denotes a stopper. Reference numeral 221 denotes a conveyer belt moving a document. When a document being moved by the conveyer belt 221 is scanned, the CIS 110 is pressed against the stopper 132, thereby being positioned in a sheet-feed scanning position at an end of the document bed glass 131.

In the flatbed scanning, that is to say, when an image of a document S placed on the document bed glass 131 is scanned, the CIS 110 moves together with the carriage 116 from the position shown in FIG. 6 (starting position) in the sub-scanning direction.

In either case of a stationary document or a document being moved by the conveyer belt 221, the present embodiment can scan the image through the document bed glass 131.

In the flatbed scanning, if the stopper 132 is in the position shown in FIG. 6, the CIS 110 returning to the starting position may collide with the stopper 132 due to inertia and be damaged.

Therefore, the present embodiment has a retracting device. The retracting device retracts the stopper 132 so that the CIS 110 returning to the starting position does not collide with the stopper 132.

The CIS 110 is fixed to a holder 911 with screws 910. The holder 911 is supported by a slider 901 in a manner such that it can move vertically. In the flatbed scanning, the holder 911 moves downward. Together with the holder 911, the stopper 132 also moves downward and is located in the position shown by a dotted line in FIG. 6. When the stopper 132 is located in this position, the projections 115a of the CIS 110 do not come into contact with the stopper 132.

The stopper 132 and the holder 911 are moved vertically by an eccentric cam 903 and a spring 902. The holder 911 is in contact with the eccentric cam 903. The spring 902 urges the stopper 132 downward. That is to say, the spring 902 urges the holder 911 against the eccentric cam 903. The stopper 132 moves upward and downward in accordance with the rotation of the eccentric cam 903.

As described above, in the present embodiment, the eccentric cam 903 and the spring 902 constitute the retracting device. Alternatively, the retracting device may be a solenoid.

In the present embodiment, the stopper 132 can be retracted from the position where the stopper 132 is located to properly position the image scanning device. Therefore, both a stationary document and a document being moved can be scanned through the same document bed glass.

Not only in the first and second embodiments but also in the present embodiment, after the stopper is fixed with the screws, the positioning pins of the document feeder 201 are fixed in positions where the pins do not project from the document feeder 210 toward the scanner body 101.

It goes without saying that the above-described image scanners can be used not only by themselves but also incorporated in an image forming apparatus.

Figure 7:
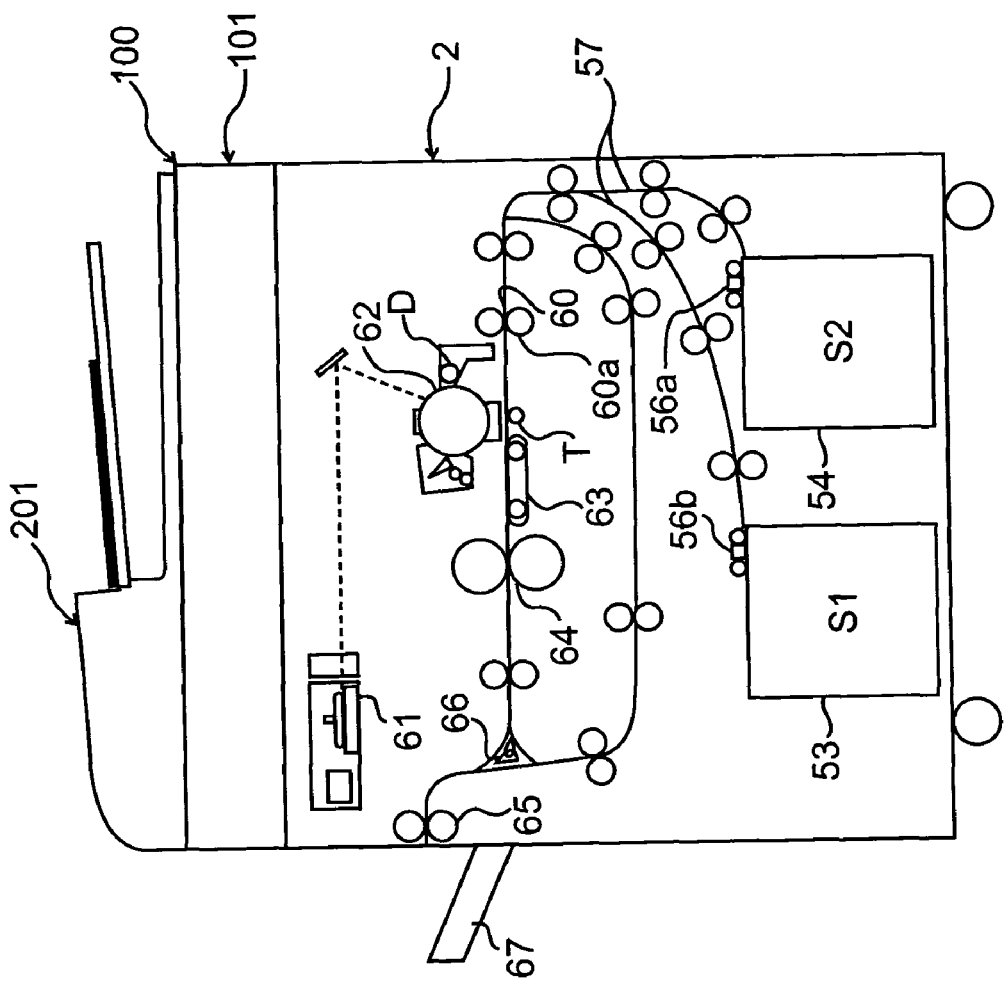
FIG. 7 is a sectional view of an image forming apparatus having an image scanner.

FIG. 7 is a sectional view of an image forming apparatus that incorporates an image scanner according to any one of the first to third embodiments.

An image forming apparatus body 2 has sheet containers 53 and 54, which contain different size sheets S (S1 and S2). The image forming apparatus body 2 has sheet feeders 56a and 56b for feeding sheets S2 and S1 contained in the sheet containers 54 and 53, respectively.

A sheet fed by the sheet feeder 56a or 56b from the sheet container 54 or 53 is moved through a sheet feeding path 57 and a sheet conveying path 60 to a photoreceptor 62. A register-roller pair 60a is disposed in front of the photoreceptor 62. The leading edge of the sheet is pressed against the register-roller pair 60a in order to correct any skew of the sheet, and the sheet is stopped on the sheet conveying path 60. When the image formation starts in the photoreceptor 62, the sheet is fed to the photoreceptor 62 by the register roller pair 60a.

According to the image data received from an image scanner 100, a laser scanner 61 scans the photoreceptor 62 with laser light in the main scanning direction so as to form an electrostatic latent image on the surface of the photoreceptor 62. Next, the electrostatic latent image becomes a toner image, that is to say, it is made visible using toner supplied from a developer D. The toner image is transferred by a transferor T to the sheet fed from one of the sheet containers 53 and 54. The sheet with the toner image transferred thereto is sent to a fixer 64 with a conveyer belt 63. The fixer 64 heats and presses the toner image on the sheet to fix the toner image to the sheet. The sheet with the toner image fixed thereto goes through a sorting flap 66 and a discharging roller pair 65 and is then discharged onto a discharged-sheet tray 67.

In any one of the above-described embodiments, an image scanner has a positioning device for properly positioning an image scanning device, and the image scanning device is properly positioned using the positioning device relative to a document feeder in the direction in which a document is moved. Therefore, the document feeder need not be adjusted relative to a scanner body. In addition, highly accurate positioning of the image scanning device relative to the document feeder can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-256058 filed Sep. 2, 2004, which is hereby incorporated by reference herein in its entirety.

What is claimed is:

1. An image scanner comprising:
   a scanner body on which a document to be scanned is placed;
   an image scanning device provided in the scanner body;
   a carriage configured to hold the image scanning device, wherein the image scanning device is held by the carriage so that the image scanning device is movable relative to the carriage;
   a guide unit which is provided on the scanner body and is configured to guide the carriage so that the carriage moves in a moving direction perpendicular to a main scanning direction of the image scanning device;
   a document feeder configured to feed documents to be scanned;
   a hinge configured to support the document feeder in a manner such that the document feeder can be in an opened state and in a closed state relative to the scanner body,
   wherein a document placed on the scanner body is read by the image scanning device while the carriage is moving in the moving direction, and a document conveyed by the document feeder is read by the image scanning device in a state in which the carriage positions at a scanning position,
   the image scanner further comprising,
   a contacting portion, provided on the carriage, that positions the image scanning device relative to the carriage by contacting the image scanning device for reading the document placed on the scanner body;
   a stopper configured to position the image scanning device; and
   a positioning member which is provided on the document feeder and is configured to position the stopper relative to the document feeder in the closed state,
   wherein the stopper is configured such that, after the stopper is positioned by the positioning member by bringing the document feeder into the closed state, the stopper is fixed at a position on the scanner body that positions the image scanning device relative to the document feeder such that the main scanning direction of the image scanning device is perpendicular to a feeding direction in which the document feeder feeds the documents, and before the stopper is positioned by the positioning member, the stopper is not fixed at the position on the scanner body, and
   wherein the carriage moves to the scanning position, at which the image scanning device scans the image of the document fed by the document feeder, such that the image scanning device is pressed against the stopper fixed on the scanner body and the image scanning device pressed against the stopper moves relative to the carriage so that the image scanning device comes out of contact with the contacting portion of the carriage, and the image scanning device is positioned by the stopper, wherein the stopper is configured to contact at two points on the image scanning device.

2. The image scanner according to claim 1, wherein the positioning member comprising a positioning pin.

3. The image scanner according to claim 2, further comprising a retracting device retracting the stopper from the position where the stopper presses against the image scanning device to position the image scanning device.

4. The image scanner according to claim 1, wherein the stopper includes a catcher into which the positioning member is fitted such that the stopper is positioned relative to the document feeder by fitting the positioning member in the catcher.

5. The image scanner according to claim 4, wherein the positioning member is configured to selectively shift so as not to be fitted in the catcher of the stopper when the document feeder is closed.

6. The image scanner according to claim 1, further comprising:
a spring provided between the carriage and the image reading device and configured to apply a force to the image reading device in the moving direction.

7. The image scanner according to claim 6 wherein while the carriage is moving for scanning the image of the document placed on the on the scanner body, the image scanning device is biased in the moving direction of the carriage by the spring to contact with the contacting portion of the carriage for positioning relative to the carriage, and
wherein when the carriage is moved to the scanning position for scanning the image of the document fed by the document feeder, the image scanning device is biased by the spring to contact with the stopper and a contacting of the image scanning device and the contacting portion of the carriage is released.

* * * * *